United States Patent [19]

King et al.

[11] Patent Number: 5,420,994
[45] Date of Patent: May 30, 1995

[54] METHOD FOR READING A MULTIPLE BYTE DATA ELEMENT IN A MEMORY SYSTEM WITH AT LEAST ONE CACHE AND A MAIN MEMORY

[75] Inventors: Edward C. King, Fremont, Calif.; Forrest O. Arnold, Springboro, Ohio; Jackson L. Ellis, Fort Collins, Colo.; Robert B. Moussavi, San Diego, Calif.; Pirmin L. Weisser, Unterkirnach, Germany; Fulps V. Vermeer, Delft, Netherlands

[73] Assignee: NCR Corp., Dayton, Ohio

[21] Appl. No.: 563,219

[22] Filed: Aug. 6, 1990

[51] Int. Cl.[6] ............................................. G06F 12/04
[52] U.S. Cl. ........................ 395/425; 364/DIG. 1; 364/260.1; 364/243.41
[58] Field of Search ... 364/200 MS File, 900 MS File; 395/400, 425

[56] References Cited

U.S. PATENT DOCUMENTS

| | | | |
|---|---|---|---|
| 4,157,586 | 6/1979 | Gannon et al. | 395/425 |
| 4,323,968 | 4/1982 | Capozzi | 395/575 |
| 4,631,668 | 12/1986 | Kubo et al. | 395/250 |
| 4,680,702 | 7/1987 | McCarthy | 395/775 |
| 4,926,317 | 5/1990 | Wallach et al. | 395/400 |
| 5,019,971 | 5/1991 | Lefsky et al. | 395/250 |
| 5,073,851 | 12/1991 | Masterson et al. | 395/425 |
| 5,091,846 | 2/1992 | Sachs et al. | 395/250 |
| 5,091,851 | 2/1992 | Shelton et al. | 395/425 |
| 5,095,527 | 3/1992 | Uramoto et al. | 395/800 |
| 5,155,824 | 10/1992 | Edenfield et al. | 395/425 |

FOREIGN PATENT DOCUMENTS 0310446 4/1989 European Pat. Off. .
0379769 8/1990 European Pat. Off. .

Primary Examiner—Rebecca L. Rudolph
Assistant Examiner—Hiep T. Nguyen
Attorney, Agent, or Firm—Douglas S. Foote

[57] ABSTRACT

A method for reading a multiple byte data element stored in both first and second memories. Selected bytes of the data element are invalidated in the first memory. Valid bytes from the first memory are combined with remaining bytes from the second memory in response to a read request.

15 Claims, 3 Drawing Sheets

METHOD FOR READING A MULTIPLE BYTE DATA ELEMENT IN A MEMORY SYSTEM WITH AT LEAST ONE CACHE AND A MAIN MEMORY

The present invention relates to computer memory systems. More particularly, it relates to a method for improving the response time of reading data from a computer memory system.

CROSS-REFERENCE TO RELATED APPLICATIONS

"Computer Memory System", U.S. patent application Ser. No. 563,216 filed concurrently herewith, invented by Edward C. King, Jackson L. Ellis, Robert B. Moussavi and Pirmin L. Weisser.

"Computer Memory Open Page Bias Method and System", U.S. patent application Ser. No. 563,221, filed concurrently herewith, invented by Edward C. King and F. Vincentinus Vermeer.

"Computer Memory System", U.S. patent application Ser. No. 563,214, filed concurrently herewith, invented by Edward C. King, Forrest O. Arnold, Jackson L. Ellis, Robert B. Moussavi, Pirmin L. Weisser and F. Vincentinus Vermeer.

"Data Prefetch Method and System" U.S. patent application Ser. No. 563,215, filed concurrently herewith, invented by Pirmin L. Weisset, F. Vincentinus Vermeer and Edward C. King.

"Computer Memory System and Method for Cleaning Data Elements" U.S. patent application Ser. No. 563,217, filed concurrently herewith, invented by Robert B. Moussavi and Jackson L. Ellis.

"Mapped Cache Structure and Method", U.S. patent application Ser. No. 563,218, filed concurrently herewith, invented by Robert B. Moussavi and Jackson L. Ellis.

"Computer Memory System and Method for Enhancing Performance on Cache Overflows", U.S. patent application Ser. No. 563,220, filed concurrently herewith, invented by Jackson L. Ellis, Robert B. Moussavi and Edward C. King.

Reference to a Microfiche Appendix

A microfiche appendix is provided herewith. The appendix includes three microfiche having a combined total of 263 frames.

BACKGROUND OF THE INVENTION

The performance of a computer system can be enhanced by the use of a memory hierarchy. For example, a three tiered memory can be constructed from low, medium, and high speed memories. A low speed memory may be a magnetic disk for low cost, bulk storage of data. A medium speed memory may be constructed from DRAMs for use as the computer system's main memory. A high speed memory may employ SRAMs for use as a processor cache memory. The theory behind memory hierarchy is to group code (instructions) and other data to be executed by the system processor in the highest speed memory. Since high speed memory is typically the most expensive memory available, economics dictate that it be relatively small. Main memory consisting of DRAMs is denser and less expensive than a cache memory with SRAMs, and can therefore be significantly larger than the cache memory.

During operation, instructions and other data are transferred from system memory to the cache memory in order to have quick access to the variables of the currently executing program. As additional data, not in the cache, is required, such data is transferred from the main memory by replacing selected data in the cache. Various replacement algorithms are utilized to determine which data is replaced.

By definition, an efficiently operating cache architecture is one which exhibits a high ratio of "hits" to accesses. A "hit" occurs when data requested is in the cache. A number of factors influence the hit ratio. The dominate factor is the locality of reference of the code being executed. In other words, if the code is located in proximate physical locations in memory, the hit ratio will be higher than if the code is widely distributed throughout memory. Another factor influencing the hit ratio of a cache is the number of devices having access to the memory. If only a single bus master, such as the system processor, has access to the memory, the data stored in the cache can be controlled to achieve a reasonably high hit ratio. However, when more than a single bus master has access to the memory through the same cache, the cache can bounce back and forth between requests from the bus masters, greatly reducing the hit ratio. In other words, the cache is non-discriminatory, with the demands of the system processor and other bus masters affecting the cache equally. One operation can significantly impact the data make-up of the cache. For example, data cached in response to memory accesses from a non-host CPU bus master will overwrite data needed by the host processor.

Another factor affecting the hit ratio relates to the fact that both code and non-code data are cached. Blocks of data in the system memory are mapped into different physical locations in the cache. If each block of data in system memory may be mapped to only a single location, the cache is known as a direct mapped cache. Set associative mapping involves each block of data being mapped to more than a single location. For example, if each block of data may be mapped to either of two locations, the cache is known as two-way set associative. Irrespective of the number of locations available for a system memory block, when both code and non-code data are being cached, there will be overlap in their respective mappings. Thus, when both code and non-code data are cached, there can be significant thrashing which takes place as data is replaced in response to memory accesses.

An issue related to cache hits is whether or not a data element in a cache is valid and/or dirty. A data element is valid as long as no corresponding element in the system memory is more current. If the data element in the cache contains multiple data bytes, the concept of validity may extend down to the byte level. In other words, it is possible for certain selected bytes of a data element to be valid while other bytes in the same element are invalid. A data element may become wholly or partially invalid if all or some of its data bytes, respectively, are written to the system memory from a bus master while the data element resides in the cache. A data element in a cache is dirty if it is more current than a corresponding element in the system memory. A data element becomes dirty when a bus master writes the element to a cache and not to system memory.

On a cache hit, if all the bytes of a data element are valid, the cache will provide the requested data element. If any of the bytes are invalid, the system memory will respond to the memory read for the data element. However, if one but not all of the data bytes are valid and dirty, any such bytes are first written from the cache to the system memory before the data element can be read from the system memory. This write back feature improves the response time of the memory system which adversely impacts system performance.

OBJECTS OF THE INVENTION

It is therefore an object of the present invention to provide a new and improved method for reading a multiple byte data element from a computer memory system.

It is another object of the present invention to provide a method for reading a multiple byte data element resident in both a cache and system memory.

It is a further object of the present invention to provide a method for improving the response time of computer memory system.

It is yet another object of the present invention to provide a method for improving the performance of a computer system.

It is yet a further object of the present invention to provide a method for enhancing both data reads and streaming reads in a memory system.

It is still another object of the present invention to provide a method to eliminate data writes from a cache to a system memory prior to reading a dirty, partially valid, multiple byte data element from the cache.

SUMMARY OF THE INVENTION

The present invention is a method for reading a multiple byte data element stored in both first and second memories. Selected bytes of the data element are invalidated in the first memory. A read request for the data element is responded to by combining valid bytes from the first memory with remaining bytes from the second memory.

The invention includes byte level data merging of valid, dirty bytes in a cache with remaining bytes of a data element from a system memory. It includes byte level data merging of valid, dirty bytes in multiple caches with remaining bytes from system memory. It also includes the merging of valid, dirty cache bytes with a high speed data stream from system memory.

DESCRIPTION OF A PREFERRED EMBODIMENT

Figure 1:
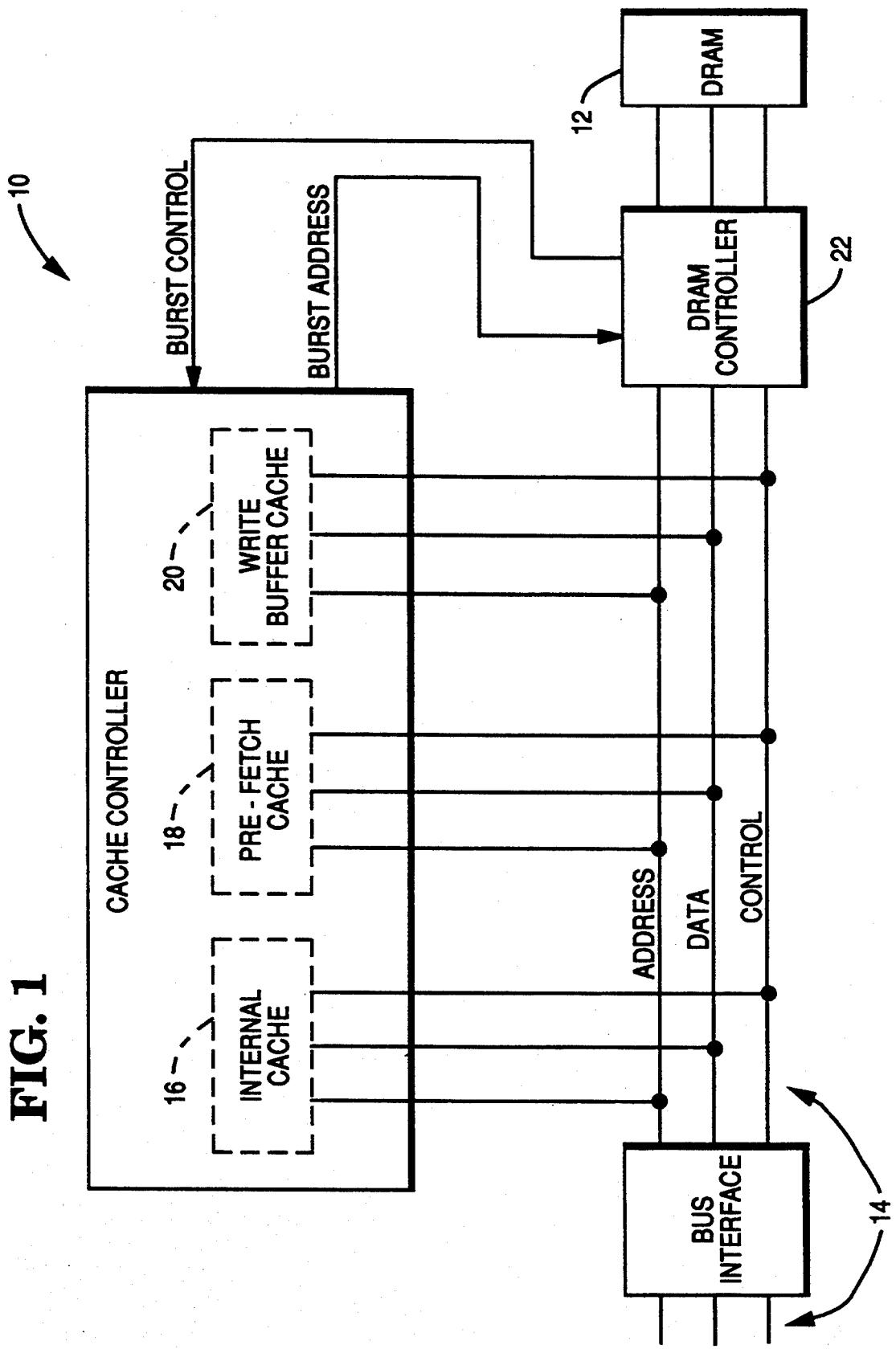
FIG. 1 is a block diagram of a high performance computer memory system which embodies the present invention.

FIG. 1 shows a block diagram of a computer memory system 10. System 10 includes a system memory 12 which in a preferred embodiment consists of dynamic random access memory (DRAM) chips. The data stored in memory 12 can be generally divided into code data (instructions) and non-code data. As used herein, the term "data" refers to information and includes both code data (instructions) and non-code data. Memory 12 is connected to other parts of a computer system (not shown) by a bus 14. Memory system 10 is designed for use with two or more bus masters, although it is operable with a single master. More particularly, it is designed for use with a host processor such as an Intel processor 386, 386sx or 486 in combination with other bus masters or devices which will compete with the host processor for access to memory system 10. Access to DRAM 12 is controlled by DRAM controller 22 which is located within bus 14.

Memory system 10 also includes an internal cache 16, a pre-fetch cache 18 and a write buffer cache 20, each connected to bus 14. In a preferred form, internal cache 16 is a 4K byte, four-way set associative cache, pre-fetch cache 18 is a 128 byte, direct-mapped cache, and write buffer cache 20 is a 128 byte, two-way set associative cache.

A feature of the caches is that their functionality may be varied depending upon the host processor type (386, 386sx or 486) utilized. However, certain features of the caches do not vary. For example, internal cache 16 holds data which is selected solely on the basis of memory accesses by the host processor. In other words, internal cache 16 is dedicated to the host processor and will not be affected by memory accesses by other bus masters. It will be appreciated that each of the caches is readable by any of the bus masters. Thus, even though cache 16 will not allow data writes therein based on memory accesses by other than the system processor, it will be read by another bus master if requested data happens to reside therein. It will further be appreciated that each of the caches snoops (observes) any data writes not intended for it in order to invalidate its contents upon snoop hits, thereby ensuring coherency.

Another immutable feature of the caches is that prefetch cache 18 contains solely code data prefetched from DRAM 12. Furthermore, it only prefetches code based on a memory access by the host processor. In operation, whenever the system processor requests code data not already in the prefetch cache, the next sequential 128 bytes of code are pre-fetched into cache 18 as a queue in anticipation of subsequent requests for code.

Write buffer cache 20 only buffers data to be written into DRAM 12. It is not merely a write buffer, but is a cache which, as mentioned above, can be read by any bus master. However, it will not cache data from DRAM 12. a420,675

An important feature of the caches is the separation of the functionality of each of the caches and the selective definition of those functions based on the processor type. By this insight, the present system is able to achieve or exceed the performance of a system utilizing a cache many times larger than the cumulative size of the subject caches. With respect to the selective definition of function based on processor type, for a system employing a 486 system processor, write buffer cache 20 buffers data writes by any bus master other than the system processor. For a system employing a 386 or 386sx system processor, internal cache 16 holds only code data and is a read only cache for the system processor, and write buffer cache 20 buffers data writes by any bus master including the system processor. The operational characteristics of the caches are defined through self configuration at power-on time based on information relating to the type of host processor present.

DRAM controller 22 supports fast page mode for accesses to DRAM 12. Fast page mode is a well known technique for speeding up accesses to DRAM by activating a row line in a memory page and then strobing sequential column lines to transfer data into or out of DRAM. DRAM 12 is divided into pages which contain either code or non-code data. A register associated with DRAM 12 is located either in DRAM 12 or DRAM controller 22 and holds the page address of a most recently accessed page. In effect, the system provides a bias towards code pages or non-code pages depending upon the type of processor connected to the system. For example, if the system processor is a 486, the address of the most recently accessed code address page is held in the register. In operation, both code and non-code data pages in DRAM 12 can be randomly accessed. If a code page is accessed on one cycle and a non-code page is accessed on the next cycle, the address of the code page is held in a register while the non-code page is accessed. Immediately after the non-code page access, the address in the register is used to reopen the code page. In contrast, if the system processor is a 386 or 386sx, the address of the most recently accessed non-code address page is held in the register. The combination of selective open page bias, fast page mode accesses and multiple caches provides increased system performance.

Write buffer cache 20 is a two-way set associative cache. The non-code data region of memory may be divided into three areas known as list, heap and stack. Data blocks in memory are reserved for the list, heap and stack, each of which has its own organization and purpose. For example, a stack is a set of data elements, only one of which can be accessed at a time. The list data is primarily read and generally not written to. In structured programs, a high percentage of writes occur to the stack with the second most data writes occurring to the heap. By proper assignment of the heap and stack data blocks in DRAM and mapping respective blocks to opposing sets in the two-way set associative cache, increased operational efficiency can be realized. Furthermore, an open page bias in the DRAM for non-code data will effectively be an open page bias for list data. In this manner, operational efficiency is further enhanced.

Figure 2:
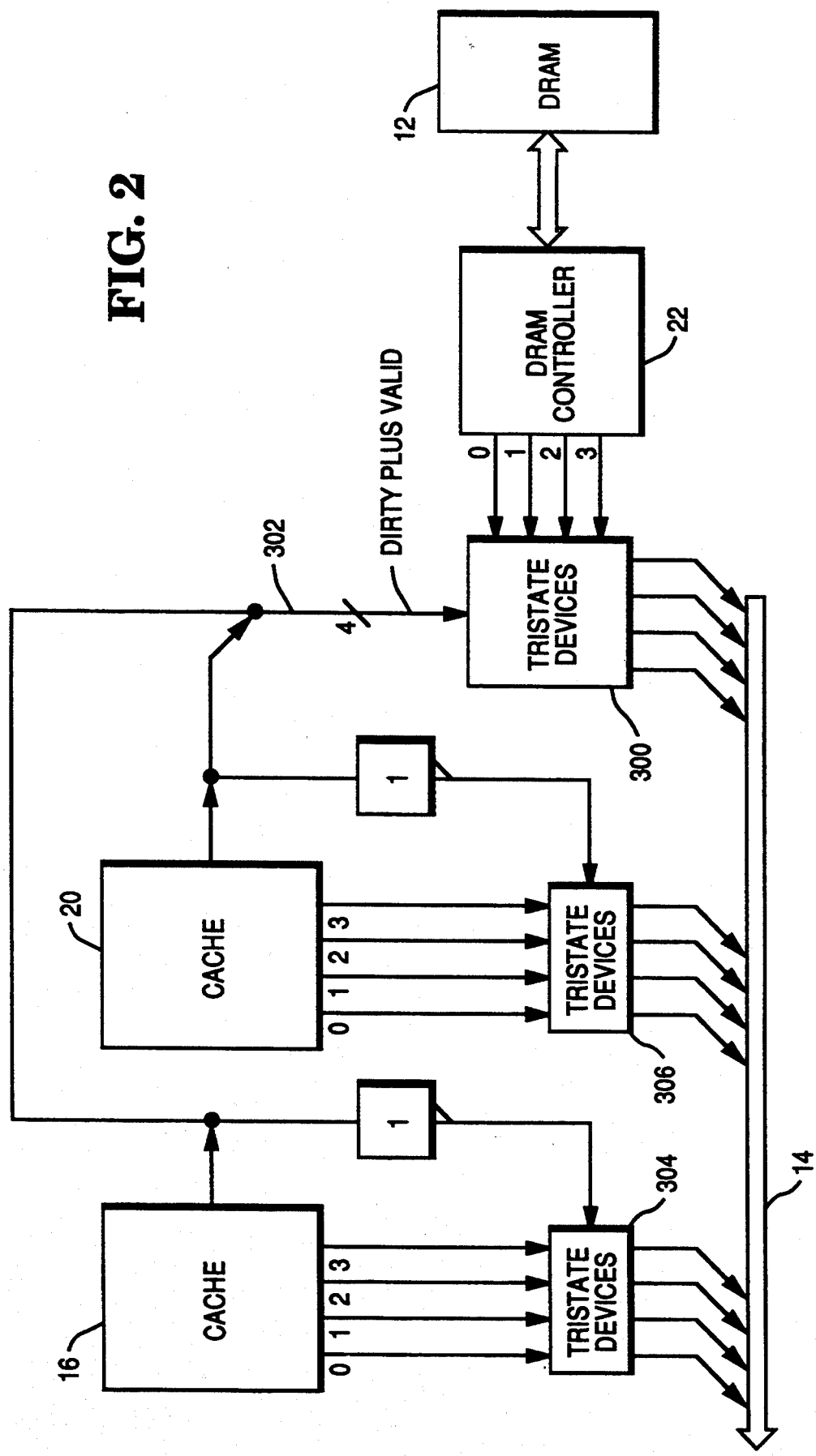
FIG. 2 is a more detailed diagram of the computer memory system shown in FIG. 1.

FIG. 2 shows more detail of computer memory system 10. DRAM 12 and controller 22 are connected to bus 14 through tristate devices 300. Bus 14 has a width of four bytes so that the four bytes of a double word (designated 0, 1, 2 and 3) may be transmitted in parallel. Each byte of a double word transmitted from DRAM 12 passes through a tristate device 300 which may block or pass selected bytes according to the control signals received by each device 300. Each tristate device 300 receives a blocking signal on control line 302 from caches 16 and 20.

Caches 16 and 20 are connected to bus 14 through tristate devices 304 and 306, respectively. As with DRAM 12, data elements in caches 16 and 20 are accessible in four parallel bytes (double word). Individual bytes may be blocked or passed in tristate devices 304 and 306 according to control signals received from caches 16 and 20.

In one embodiment, the control signal for blocking a data byte from DRAM 12 is active when the corresponding data byte in either cache 16 or 20 is valid and dirty. Each byte of a multiple byte data element in cache 16 and 20 has a bit associated therewith which is set as "valid" when the data element is first written into the cache. Under certain operating conditions it may be necessary to invalidate one or more bytes in an element. For example, if a high speed transfer from a bus master directly to DRAM 12 (fast page mode) is performed, each cache will watch or "snoop" bus 14. If any data elements corresponding to those in a cache are written into DRAM 12 in this manner, the respective bytes in such corresponding data element are set as "invalid". As a further example, it may sometimes be desirable to transfer data elements from one cache to another. Any byte so transferred will be set invalid in the source cache to avoid ambiguity. Each multiple byte data element in cache 16 and 20 also has a bit associated therewith which is designated as its "dirty" bit. A dirty bit is a flag which indicates that the cache written to has information that has not yet been written to memory, i.e., it represents the most up-to-date value of a given data element. The dirty bit is typically set when data is written into the cache from a bus master. "Dirty" data is "cleaned" by writing the data to the system memory. Although the subject invention provides a valid bit at the byte level and a dirty bit at the element level, it is possible to change the granularity.

The present invention has several modes of operation. In the first mode, individual data elements are requested to be read by a bus master. Normally, the caches are checked and if the data element resides therein it is returned very quickly to the bus master. If the data element is not in the cache, DRAM controller 22 and DRAM 12 are activated and the data element fetched from DRAM 12 (a somewhat longer procedure than obtaining the element from a cache). If the data element is in one or more of the caches, and if some but not all of its data bytes are valid and dirty, DRAM controller 22 and DRAM 12 are activated and its bytes provided to tristate devices 300. However, for any byte having a corresponding dirty and valid byte in one of the caches, such byte is blocked by a tristate device 300. At the same time, tristate devices 304 and 306 will only pass bytes which are both dirty and valid. In this manner, a complete data element may be read by a bus master.

More particularly, when a data element is stored in both a cache and DRAM 12, a necessary condition for the inventive method is that selected bytes of the data element in the cache have been invalidated. A valid/invalid flag is provided for each byte of each data element stored in the cache. The flags for respective bytes are set valid when the data element is first written to the cache. Selected flags are thereafter set invalid for conditions such as stated previously. In most applications of the subject invention, a further necessary condition is that selected bytes have also been written into the cache from other than DRAM 12 and designated as dirty. When a bus master attempts to read the data element, the caches are first checked. If the element is found in a cache, but it contains some invalid bytes, a signal is provided to activate DRAM 12. Only a valid and dirty byte from the cache is combined with bytes from DRAM 12. The valid flag for a dirty byte are used to disconnect the corresponding line from DRAM 12 to bus 14 to block the transfer of the corresponding data byte from DRAM 12. Similarly, the valid flag for a dirty byte (or an inverted form thereof) is used to connect a corresponding byte line from the cache to bus 14.

The method also is effective when the subject data element is spread over more than a single cache. In other words, the data element has been provided to a second cache from other than DRAM 12 and has thus been designated as dirty. Furthermore, selected data bytes in the second cache data element have been invalidated. However, it is important that at least one of each of the corresponding bytes in the two caches is invalid to prevent ambiguity. In response to a data read by a bus master., each cache is again checked for the specified data element. If the element is resident in both caches and if any pair of corresponding data bytes in the two caches are both detected as being invalid, a signal is sent to activate DRAM 12. As before, valid and dirty bytes are provided from a cache and the corresponding bytes from DRAM 12 are blocked.

In a second mode of operation, the present invention responds to large transfers of data directly from DRAM 12 to a bus master. For example, the subject invention supports a "streaming mode" such as found on the IBM Microchannel architecture. In this mode, DRAM 12 operates in a fast page mode, and sequentially responds to read requests by transferring data elements from DRAM 12. The caches are checked for each data element but at the same time as DRAM 12 is activated, and not prior to DRAM 12 being activated, as in the first mode described above. Whenever, a dirty and valid byte in one of the caches is detected, the corresponding data byte line from DRAM 12 is blocked and the dirty and valid data byte is merged.

The detail design of the present invention is captured in CDL, a high level hardware description language. CDL is a software tool which unambiguously defines the hardware for a digital logic system. The CDL listing completely defines a preferred embodiment of computer memory system 10. The listing may be compiled to generate a "C" source code which may then be compiled by a C compiler to generate a standardized C Object File Format (COFF). The COFF is then input to a logic synthesis program to provide a detailed logic schematic. A logic synthesis program which may be used for this purpose is SYNOPSYS, available from Synopsys Inc., Mountain View, Calif.

Figure 3:
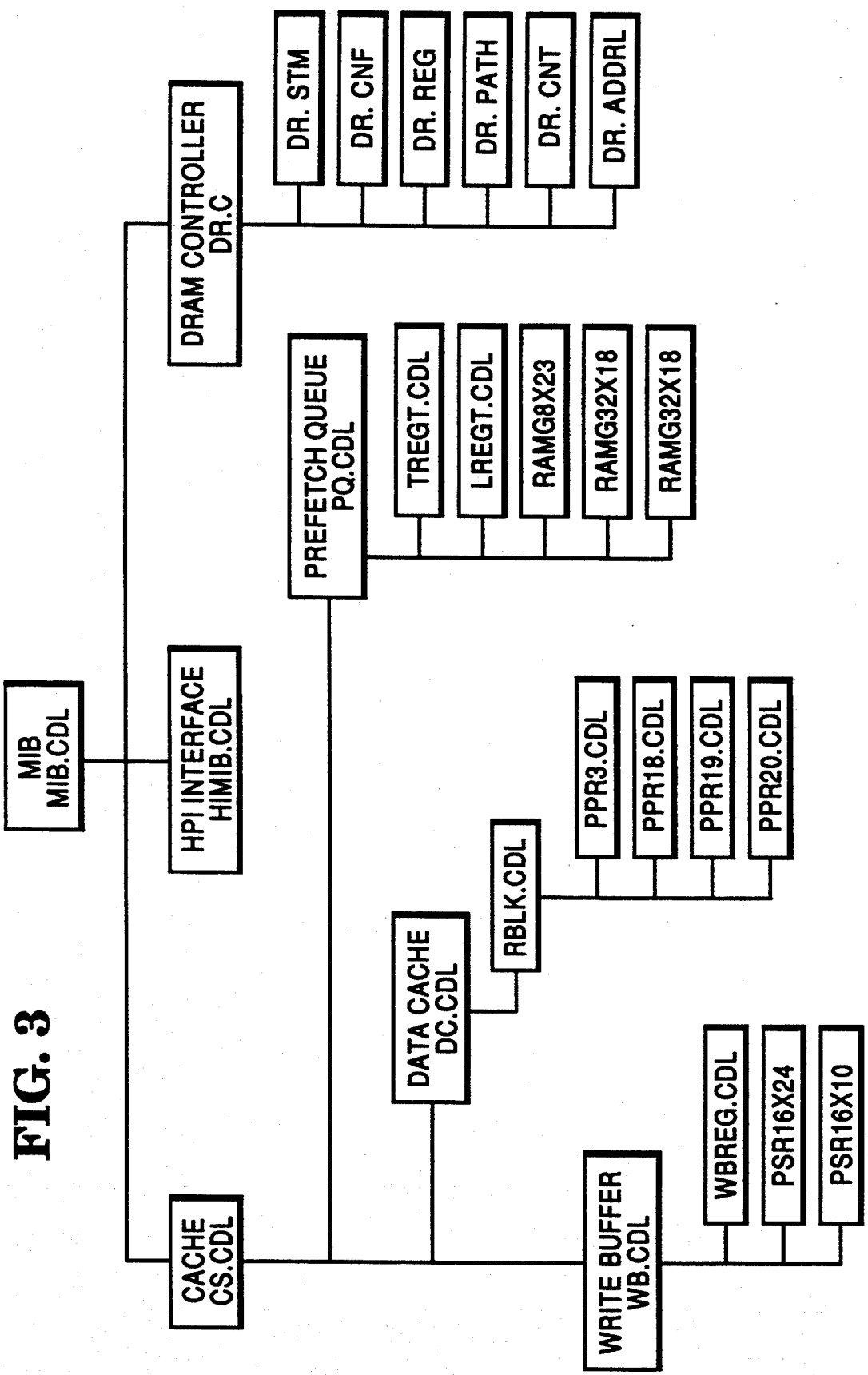
FIG. 3 is a block diagram showing the relationship between modules of the memory system.

FIG. 3 shows the relationship between the modules of the present invention. The structure and mode of operation of each of these modules is defined by the CDL listing, provided herewith as a microfiche appendix.

It will be clear to those skilled in the art that the present invention is not limited to the specific embodiment disclosed and illustrated herein. Numerous modifications, variations, and full and partial equivalents can be undertaken without departing from the invention as limited only by the spirit and scope of the appended claims.

What is desired to be secured by Letters Patent of the United States is as follows:

1. In a computer system having first and second memories connected to a data bus, said data bus having a width of n bytes so that an n-byte data element may be transmitted in parallel, each of said memories having addressable locations which store n-byte data elements, a method comprising:
   a. storing first and second n-byte data elements having a common address in first and second locations in said first and second memories, respectively; and
   b. responding to a first read request by selecting bytes from each of said first and second data elements and transferring the selected bytes at the same time from said first and second memories to said bus.

2. The method of claim 1, further comprising prior to step "b":
   designating each byte of said first data element in said first memory as valid or invalid;
   wherein only valid bytes from the first data element are selected in step "b".

3. The method of claim 2, wherein said system includes a bus master connected to said bus, further comprising prior to step "b":
   designating selected bytes in said first memory as dirty;
   wherein data bytes are designated as dirty when they are written into said first memory location from said bus master.

4. The method of claim 3 wherein only bytes which are both valid and dirty are selected in step "b".

5. The method of claim 4 wherein said first memory is a cache and said second memory is a system memory.

6. The method of claim 5 wherein step "b" includes:
   checking said cache for said first data element; and
   generating a signal, when invalid bytes in said first data element are detected, to activate said system memory.

7. The method of claim 5 wherein said cache includes a valid/invalid flag for each byte of each data element stored therein representing whether the byte is valid or invalid and wherein each byte of said first data element has a corresponding byte in said second data element.

8. The method of claim 7 wherein valid flags for dirty bytes are used to block the transfer of corresponding data bytes from said system memory.

9. The method of claim 8 wherein said bus has the same number of byte wide lines as the number of bytes in said data element, wherein data bytes are blocked by disconnecting corresponding lines from said memory, and wherein each dirty and valid byte from said cache is combined with remaining bytes from said system memory by connecting corresponding lines from said cache.

10. The method of claim 5 wherein a second cache is also connected to said bus.

11. The method of claim 10 wherein step "b" includes:
   checking each cache for said first data element.

12. The method of claim 11 wherein:
   step "a" further comprises storing a third n-byte data element having the same address as said first and second data elements in said second cache; and
   step "b" further comprises responding to said first read request by selecting bytes from said each of said first and second caches and system memory and transferring the selected bytes at the same time from said caches and memory to said bus.

13. The method of claim 5 further comprising, prior to responding to said first read request:
   sequentially responding to other read requests by transferring a plurality of data elements from said memory.

14. The method of claim 13, further comprising:
   activating said memory while checking said cache for a data element responsive to said first read request.

15. The method of claim 14 wherein valid bytes from said cache are combined with remaining bytes from said system memory only for bytes of said cache data element which are dirty and valid.

* * * * *

UNITED STATES PATENT AND TRADEMARK OFFICE
CERTIFICATE OF CORRECTION

PATENT NO. : 5,420,994
DATED : May 30, 1995
INVENTOR(S) : Edward C. King et al.

It is certified that error appears in the above-indentified patent and that said Letters Patent is hereby corrected as shown below:

```
Column 8, line 14, after "dirty" insert --in
said first memory--.

Column 8, line 33, before "memory" insert
--system--.
```

Signed and Sealed this

Tenth Day of December, 1996

Attest:

BRUCE LEHMAN

Attesting Officer

Commissioner of Patents and Trademarks